3,242,115
STABILIZATION OF POLY(OLEFIN OXIDES)
Charles W. McGary, Jr., South Charleston, W. Va., assignor to Union Carbide Corporation, a corporation of New York
No Drawing. Filed Oct. 12, 1962, Ser. No. 230,249
7 Claims. (Cl. 260—29.2)

This application is a continuation-in-part of an application entitled "Stabilization of Poly(Olefin Oxides)," Serial No. 26,412, filed May 3, 1960, by C. W. McGary, Jr., and assigned to the same assignee as the instant invention, now abandoned.

This invention relates to olefin oxide polymers. In one aspect, this invention relates to the stabilization of olefin oxide polymers against appreciable molecular degradation during storage, in transit, during processing, and the like.

The tendency for olefin oxide polymers to degrade has presented a serious problem in those fields of application where molecular weight stability is both a necessary and desirable feature. It has been noted that olefin oxide polymers can undergo a substantial loss in average molecular weight when dissolved in water or organic solvents, particularly when the resulting solutions are subjected to elevated temperatures or stored at room temperature for prolonged periods of time. The effect of the reduced viscosity loss or molecular weight degradation is more prevalent as the molecular weight of the polymer increases. The particular use to which the polymer is ultimately put, will largely be determinative of the permissible variation of the molecular weight range. For instance, a customer who orders an olefin oxide polymer of a definite viscosity range for a particular field of application desires a product of relative stability or enhanced stability especially when stored in the form of an aqueous or organic solution. However, unless the olefin polymer is adequately protected against substantial molecular weight degradation, the loss in molecular weight can be so serious as to completely change the physical character of the polymer, and as a consequence, the resulting degraded polymer has limited applicability or no applicability for the original intended use.

Accordingly, one or more of the following objects will be achieved by the practice of the instant invention. It is an object of this invention to improve the stability of olefin oxide polymers against molecular degradation. It is another object of this invention to provide aqueous or organic solution comprising a resinous olefin oxide polymer and a stabilizing amount of a stabilizer hereinafter defined. A further object of the present invention is to improve the stability in solution of poly(ethylene oxide) which has a reduced viscosity value in the range of from about 1 to 75, and higher, against molecular degradation. Another object is to improve the stability in solution of copolymers comprised of at least 50 weight percent of ethylene oxide in copolymerized form, with up to 50 weight percent of lower olefin oxides, such as, propylene oxide, butylene oxide, and the like. A still further object is to provide a process for stabilizing olefin oxide polymers against molecular degradation. Another object of the present invention is to provide a novel process for stabilizing solid copolymers of at least 50 weight percent of ethylene oxide in copolymerized form with up to 50 weight percent of lower olefin oxides, such as, propylene oxide, butylene oxide, and the like, against molecular degradation. Another object of the present invention is to render granular poly(ethylene oxide) which as a reduced viscosity value of at least about 1.0 relatively stable against molecular weight degradation. These and other objects will readily become apparent to those skilled in the art in the light of the teachings herein set forth.

The present invention contemplates the stabilization of olefin oxide polymers by incorporating therein a stabilizing amount of a primary or secondary aliphatic, monohydric alcohol having from 2 to 6 carbon atoms. The aforesaid olefin oxide polymers exhibit improved stability against molecular weight degradation during storage, transit, or processing over extended periods of time, e.g., several weeks, as compared with corresponding olefin oxide polymers lacking the above-mentioned stabilizers.

By the term "reduced viscosity," as employed throughout the specification and appended claims, is meant a value obtained by dividing the specific viscosity by the concentration of the polymer in solution, the concentration being measured in grams of polymer per 100 milliliter of solvent at a given temperature. The term is regarded as a measure of molecular weight. The specific viscosity is obtained by dividing the difference between the viscosity of the solution and the viscosity of the solvent by the viscosity of the solvent. Unless stated otherwise, the reduced viscosities herein referred to are measured at a concentration of 0.2 gram of polymer in 100 milliliters of acetonitrile at 30° C. Also, unless otherwise stated herein, the reduced viscosity of olefin oxide polymer, particularly homopolymers of ethylene oxide and copolymers thereof, is a value in the range of at least 1.0 and upwards to 75, and higher.

The term "aqueous bulk viscosity," as employed herein, refers to the viscosity of the stated concentration of polymer in water, as measured on a model RVF Brookfield viscometer using a No. 2 spindle operated at 6 revolutions per minute, unless otherwise stated. The viscosity is measured at ambient room temperatures, that is, about 24° C.

In its broad aspect, the stabilizers of the instant invention, as hereinbefore indicated, are the primary and secondary, alpihatic, monohydric alcohols containing from 2 to 6 carbon atoms. Illustrative stabilizers suitable for use in the practice of the instant invention include: ethanol, 1-propanol, 2-propanol, 1-butanol, 2-butanol, 1-pentanol, 2-pentanol, 3-pentanol, 2-methyl-3-pentanol, 1-hexanol, 2-hexanol, 3-hexanol, allyl alcohol, methallyl alcohol, and the like. The aforementioned stabilizers can contain olefinic unsaturation as long as they are essentially nonreactive with the candidate polymer. Thus, in its broad aspect the instant invention encompasses primary and secondary alkanols and alkenols containing from 2 to 6 carbon atoms.

The presence of at least one hydrogen atom on the carbon atom bearing the hydroxyl group is necessary to effectively stabilize the olefin oxide polymers. It is noteworthy that monohydric tertiary alcohols which contain no hydrogen atom attached to the hydroxyl-bearing carbon atom do not effectively stabilize the olefin oxide polymers against molecular degradation. Moreover, aliphatic alcohols which contain less than 2 carbon atoms, e.g., methanol, or greater than 6 carbon atoms, e.g., 1-octanol, differ markedly from the aforementioned alcohols in their ability to effectively stabilize olefin oxide polymers. In contrast, the primary and secondary aliphatic monohydric alcohols containing from 2 to 6 carbon atoms are quite effective in stabilizing olefin oxide polymers, particular poly(ethylene oxide), against molecular degradation. In a particularly preferred embodiment of the instant invention the olefin oxide polymers are stabilized with isopropanol.

The manner by which the aforesaid stabilizers are incorporated or admixed with the olefin oxide polymer does not appear to be critical and any of several means can be employed to effect such admixture.

When the polymer is to be stored or utilized in the form of an aqueous solution or contained in an inert, normally liquid organic vehicle, it has been found desirable to add the stabilizer to the polymer solvent prior to, or during the period when said polymer is being dissolved. Inasmuch as some degradation may otherwise occur while the polymer is being dissolved, the greatest stability is obtained by this practice. However, it should be noted that addition of the stabilizer at any stage imparts a stabilizing effect from thence forth. Suitable inert normally liquid organic solvents in which the polymer and stabilizer are soluble include, among others, acetic acid, acetonitrile, chloroform, methylene chloride, benzene, chlorobenzene, water and the like. It should be noted that in some instances the vehicle for the olefin oxide polymer may itself consist predominantly of an alcohol and thereby serve a dual function as both solvent and stabilizer.

As previously indicated, the instant invention contemplates the use of a stabilizing amount of the stabilizer whereby the polymer is stabilized against substantial molecular weight degradation. By the term "stabilizing amount" as herein used, is meant that quantity of stabilizer which when added to the system containing olefin oxide polymer, in particular poly(ethylene oxide), is sufficient to effectively stabilize the polymer against substantial molecular weight degradation. The term also expresses the amount of stabilizer necessary to reduce the loss of viscosity of the polymer being stabilized, during storage, in transit, and the like, as compared with the corresponding polymer not containing therein the stabilizers of the invention.

In general, the concentration of stabilizer is not narrowly critical and, for the most practical purposes, can range from about 0.001 to about 10 weight percent, and higher, based on the total weight of solid polymer. When the polymer is dissolved in water or organic solvents it is preferred to employ at least 5 percent and more preferably at least 10 percent stabilizer based on the weight of the polymer. The aforesaid concentrations obviously may be modified in some instances by the compatibility of the stabilizer, solvent and olefin oxide polymer and consequently, from this standpoint the range depends upon the selection of stabilizer and solvent.

However, in those instances wherein the polymer vehicle itself consists primarily of one of the particular alcohols having stabilizing properties, the upper limit will largely be determined by the particular concentration of polymer desired rather than by the amount of alcohol employed as solvent. For example, a 1 weight percent isopropanol solution of poly(ethylene oxide) will inherently be stable against molecular degradation regardless if said solution is thereafter further diluted. Thus once the quantity of alcohol solvent exceeds the minimum amount necessary to effectively stabilize the olefin oxide polymer, the need for additional solvent will be dependent upon the desired concentration of poly(ethylene oxide).

The following examples are illustrative:

EXAMPLE 1

While not wishing to be bound by any particular mechanisms regarding the degradation of olefin oxide polymers, it has been established that molecular degradation can be achieved by mechanical shearing forces, which presumably causes polymer chain scission. However, this does not explain the gradual viscosity loss, i.e. molecular degradation, under non-shearing conditions. Under the latter conditions, as might be encountered in aqueous or organic solutions, it is believed that the olefin oxide polymers degrade primarily by autoxidation resulting in polymer chain cleavage. It has been noted that this degradation of olefin oxide polymers, and in particular poly(ethylene oxide), is accelerated by the presence of such factors as oxygen, hydrogen peroxide, certain metal ions, ultraviolet light, and others. The effect of said factors on the molecular weight properties of olefin oxide polymers can readily be seen by reference to the following table wherein resinous poly(ethylene oxide) is illustrative of the polymer employed:

*Table I*

EFFECT OF OXIDIZING AGENTS ON THE VISCOSITY OF AQUEOUS SOLUTIONS OF POLY(ETHYLENE OXIDE)

| Oxidizing Agent [a] | Viscosity, cps. at 25° C. | |
|---|---|---|
| | Initial [b] | Final [c] |
| Hydrogen Peroxide | 1,770 | 60 |
| Peracetic Acid | 2,630 | 30 |
| Bromine | 1,420 | 120 |
| Potassium permanganate | 1,420 | 40 |

[a] Concentration of oxidizing agent is 0.01 gram per 1.0 gram of poly(ethylene oxide).
[b] Before addition of oxidizing agent.
[c] One day after addition of oxidizing agent.

EXAMPLES 2–8

Granular poly(ethylene oxide) prepared by solution polymerization using a calcium amide catalyst was employed in the following examples. The initial aqueous bulk viscosity of 1.0 weight percent polymer in aqueous solution was about 1,180 centipoises as determined by the model RVF Brookfield viscometer using the No. 2 spindle operating at 6 r.p.m. The aqueous bulk viscosities of these solutions were again determined in a similar manner after aging for the indicated time.

One gram of the above-described polymer and solvent proportions, as indicated in Table II, were placed in a four-ounce bottle. The bottles were rolled gently for 44 hours, after which time the solutions were homogeneous. The initial viscosity and the viscosity after storage in the dark for seven weeks were measured by the viscometer described above. The pertinent data and results are shown in Table II:

*Table II*

STABILIZATION OF GRANULAR POLY(ETHYLENE OXIDE) WITH ISOPROPANOL

| Example | Milliliters of Water | Milliliters of of Stabilizer [a] | Initial Viscosity [b] | Storage, 7 weeks 25° C.- Viscosity [b] |
|---|---|---|---|---|
| 2 | 100 | [c] 0 | 1,180 | 780 |
| 3 | 95 | 5 | 1,870 | 1,820 |
| 4 | 90 | 10 | 2,210 | 2,180 |
| 5 | 75 | 25 | 2,990 | 2,970 |
| 6 | 50 | 50 | 3,800 | 3,780 |
| 7 | 25 | 75 | 2,930 | 3,050 |
| 8 | 10 | 90 | 1,920 | 1,940 |

[a] Isopropanol.
[b] Aqueous bulk viscosity measured in centipoises.
[c] Control.

EXAMPLES 9–14

In order to clearly demonstrate the superior stabilizing effect of primary and secondary alkanols and alkenols containing from 2 to 6 carbon atoms, a comparison of stabilizing ability was made with other alcohols which either contained less than 2 carbon atoms, or which did not possess at least one hydrogen attached to the hydroxyl bearing carbon atom.

Granular poly(ethylene oxide) prepared by solution polymerization using a calcium amide catalyst was employed in these examples. The initial aqueous bulk viscosity of 1.0 weight percent polymer in aqueous solution was about 870 centipoises as determined by the model RVF Brookfield viscometer using the No. 1 spindle operating at 2 r.p.m. The aqueous bulk viscosities of these solutions were again determined in a similar manner after aging for the indicated time.

One gram of the above described polymer was dissolved in a mixture containing 90 milliliters of water and 10 milliliters of the alcohols hereinafter indicated. The bottles containing the solutions were exposed for 50 hours to the radiation of a standard 275 watt sun lamp at a distance of about two feet. The initial and final viscosities were determined by the method previously indicated. The pertinent data and results are shown in Table III:

Table III
COMPARISON OF STABILIZING ABILITY OF VARIOUS ALCOHOLS

| Example | Alcohol | Initial Viscosity [a] | Final Viscosity [a] | Percent Viscosity Loss |
|---|---|---|---|---|
| 9 | Control | 870 | 310 | 64 |
| 10 | Methanol | 1,200 | 600 | 50 |
| 11 | Ethanol | 1,440 | 1,260 | 12.5 |
| 12 | Isopropanol | 1,500 | 1,350 | 10.0 |
| 13 | Allyl alcohol | 1,320 | 1,220 | 7.6 |
| 14 | t-Butyl alcohol | 1,390 | 540 | 61 |

[a] Aqueous bulk viscosity measured in centipoises.

EXAMPLES 15–19

In order to clearly demonstrate the superior stabilizing effect of primary and secondary alkanols and alkenols containing from 2 to 6 carbon atoms, a comparison of stabilizing ability was made with alcohols which contained more than 6 carbon atoms.

One gram of the same poly(ethylene oxide) employed in the previous examples was dissolved in 90 milliliters of methylene chloride. 10 milliliters of the alcohols hereinafter indicated were added to the solution which was then exposed to ultraviolet light for a period of 15 hours. The pertinent data and results are shown in Table IV:

Table IV
COMPARISON OF STABILIZING ABILITY OF VARIOUS ALCOHOLS

| No. | Stabilizer | Initial Viscosity [a] | Final Viscosity [a] | Percent Viscosity Loss |
|---|---|---|---|---|
| 15 | Control | 2,110 | 1,240 | 41 |
| 16 | Isopropanol | 1,890 | 1,720 | 9.0 |
| 17 | Methallyl alcohol | 2,140 | 1,940 | 9.3 |
| 18 | 1-Hexanol | 2,140 | 1,900 | 11.2 |
| 19 | 1-octanol | 2,300 | 1,690 | 26.5 |

[a] Aqueous bulk viscosity measured in centipoises.

EXAMPLES 20–31

Solutions of the same poly(ethylene oxide) employed in the previous examples were prepared by dissolving from 1 to 1.5 grams of the polymer per 100 milliliters of solvent in water and in a solvent mixture containing equal volumes of water and isopropanol. In order to determine the effectiveness of the isopropanol stabilizer in the presence of certain degrading agents, small quantities of ferrous sulfate, hydrogen peroxide, cupric chloride and hydrogen chloride were added. The initial and final viscosities were determined by the method previously indicated. The pertinent data and results are shown in Table V:

Table V
EFFECT OF ISOPROPANOL STABILIZER IN PRESENCE OF DEGRADING AGENTS

| Example | Degrading Agent | Aging Time | Initial Viscosity [c] | Final Viscosity [c] | Percent Viscosity Loss |
|---|---|---|---|---|---|
| 20 | None [a] | 7 weeks | 1,180 | 780 | 34 |
| 21 | CuCl$_2$ [a] | 3.5 weeks | 1,390 | 600 | 57 |
| 22 | FeSO$_4$ [a] | 2 hours | 1,250 | 50 | 96 |
| 23 | H$_2$O$_2$ [a] | 8 days | 3,730 | 80 | 98 |
| 24 | HCl (pH, 3.8) [a] | 7 days | 1,200 | 180 | 85 |
| 25 | HCl (pH, 1.1) [a] | do | 730 | 20 | 97 |
| 26 | None [b] | 7 weeks | 3,800 | 3,780 | 0.5 |
| 27 | CuCl$_2$ [b] | 3.5 weeks | 3,300 | 3,220 | 2.4 |
| 28 | FeSO$_4$ [b] | 5 days | 2,270 | 2,120 | 6.6 |
| 29 | H$_2$O$_2$ [b] | 6 days | 2,190 | 2,200 | 0 |
| 30 | HCl (pH, 4.2) [b] | 10 days | 2,240 | 2,140 | 4.5 |
| 31 | HCl (pH, 1.2) [b] | do | 2,180 | 2,000 | 8.3 |

[a] Water solvent.
[b] Water-isopropanol solvent containing 50 percent by weight of isopropanol on total weight of solvent.
[c] Aqueous bulk viscosity measured in centipoises.

EXAMPLES 32–34

One gram of the same poly(ethylene oxide) employed in the previous examples was dissolved in 100 milliliters of a solvent containing methylene chloride and isopropanol in the ratio hereinafter indicated and thereafter exposed to ultraviolet light for 50 hours. The initial and final viscosities were determined as previously indicated. The pertinent data and results are shown in Table VI:

Table VI
EFFECT OF ULTRAVIOLET LIGHT ON ISOPROPANOL STABILIZED POLYMER

| Ex. | Milliliters of Stabilizer [a] | Milliliters of Methylene Chloride | Initial Viscosity [b] | Final Viscosity [b] | Percent Loss of Viscosity |
|---|---|---|---|---|---|
| 32 | 0 | 100 | 2,200 | 110 | 95 |
| 33 | 10 | 90 | 2,240 | 2,030 | 9.4 |
| 34 | 50 | 50 | 1,390 | 1,320 | 5.0 |

[a] Isopropanol.
[b] Aqueous bulk viscosity measured in centipoises.

EXAMPLES 35–39

One gram of the same polymer employed in Examples 9–14 was dissolved in a mixed solvent as hereinafter indicated and subsequently exposed for 20 hours to the radiation of a standard 275 watt sun lamp at a distance of about two feet. The initial and final viscosities were determined by the method previously indicated. The pertinent data and results are shown in Table VII:

Table VII

| No. | Milliliters of Water | Milliliters of Stabilizer [a] | Initial Viscosity [b] | Final Viscosity [b] | Percent Viscosity Loss |
|---|---|---|---|---|---|
| 35 | 100 | 0 | 760 | 410 | 46 |
| 36 | 100 | 0.1 | 930 | 640 | 31 |
| 37 | 99.5 | 0.5 | 920 | 790 | 14 |
| 38 | 99 | 1.0 | 860 | 710 | 17 |
| 39 | 98 | 2.0 | 990 | 830 | 16 |

[a] Isoporopanol.
[b] Aqueous bulk viscosity measured in centipoises.

Although the invention has been illustrated by the preceding examples, the invention is not to be construed as limited to the materials employed in the above examples, but rather, the invention encompasses the generic area as hereinbefore disclosed. Various modifications and embodiments of this invention can be made without departing from the spirit and scope thereof.

What is claimed is:

1. A process for stabilizing a solid lower olefin oxide polymer against conditions conducive to molecular weight degradation, said olefin oxide having a reduced viscosity value of at least 1.0 as measured at a concentration of 0.2 gram of said polymer in 100 milliliters of acetonitrile at 30° C., which process comprises adding to said olefin oxide polymer from about 0.001 to about 10 weight percent, based on the weight of said polymer, of a compound selected from the group consisting of primary and secondary alkanols and alkenols containing from 2 to 6 carbon atoms.

2. A process for stabilizing a solid copolymer against conditions conducive to molecular weight degradation, said copolymer comprised of at least 50 weight percent of ethylene oxide in copolymerized form with up to 50 weight percent of a lower olefin oxide which is selected from the group consisting of propylene oxide and butylene oxide, said copolymer having a reduced viscosity value of at least 1.0 as measured at a concentration of 0.2 gram of said copolymer in 100 milliliters of acetonitrile at 30° C., which process comprises adding to said copolymer from about 0.001 to about 10 weight percent, based on the weight of said copolymer, of a compound selected from the group consisting of primary and secondary alkanols and alkenols containing from 2 to 6 carbon atoms.

3. A process for stabilizing solid poly(ethylene oxide) against conditions conducive to molecular weight degradation, said poly(ethylene oxide) having a reduced viscosity value of at least 1.0 as measured at a concentration of 0.2 gram of said poly(ethylene oxide) in 100 milliliters of acetonitrile at 30° C., which process comprises adding to said poly(ethylene oxide) from about 0.001 to about 10 weight percent, based on the weight of said poly(ethylene oxide), of a compound selected from the group consisting of primary and secondary alkanols and alkenols containing from 2 to 6 carbon atoms.

4. The process of claim 3 wherein the solid poly(ethylene oxide) is contained in an aqueous solution.

5. The process of claim 3 wherein the solid poly(ethylene oxide) is contained in an inert, normally liquid organic vehicle.

6. The process of claim 5 wherein said organic vehicle is methylene chloride.

7. A composition comprising a lower olefin oxide polymer which has a reduced viscosity value of at least 1.0 as measured at a concentration of 0.2 gram of said polymer in 100 milliliters of acetonitrile at 30° C., and from about 0.001 to about 10 weight percent, based on the weight of said polymer, of a compound selected from the group consisting of primary and secondary alkanols and alkenols containing from 2 to 6 carbon atoms.

References Cited by the Examiner

UNITED STATES PATENTS

| | | | |
|---|---|---|---|
| 1,921,378 | 8/1933 | Webel | 260—340.6 |
| 2,516,960 | 8/1950 | Coffman | 260—2 |
| 2,706,181 | 4/1955 | Pruitt et al. | 260—45.95 |
| 2,914,491 | 11/1959 | Bailey | 260—2 |

OTHER REFERENCES

Davidson-Sittig: Water Soluble Resins, N.Y., Reinhold, 1962.

MURRAY TILLMAN, *Primary Examiner.*

JAMES A. SEIDLECK, *Examiner.*